May 16, 1961　　　H. E. CLARY　　　2,984,258
CONTROL VALVE
Filed July 20, 1959　　　　　　　　　　　　5 Sheets-Sheet 1

Inventor
Harry E. Clary
by Hill, Sherman, Meroni, Gross & Simpson Attys.

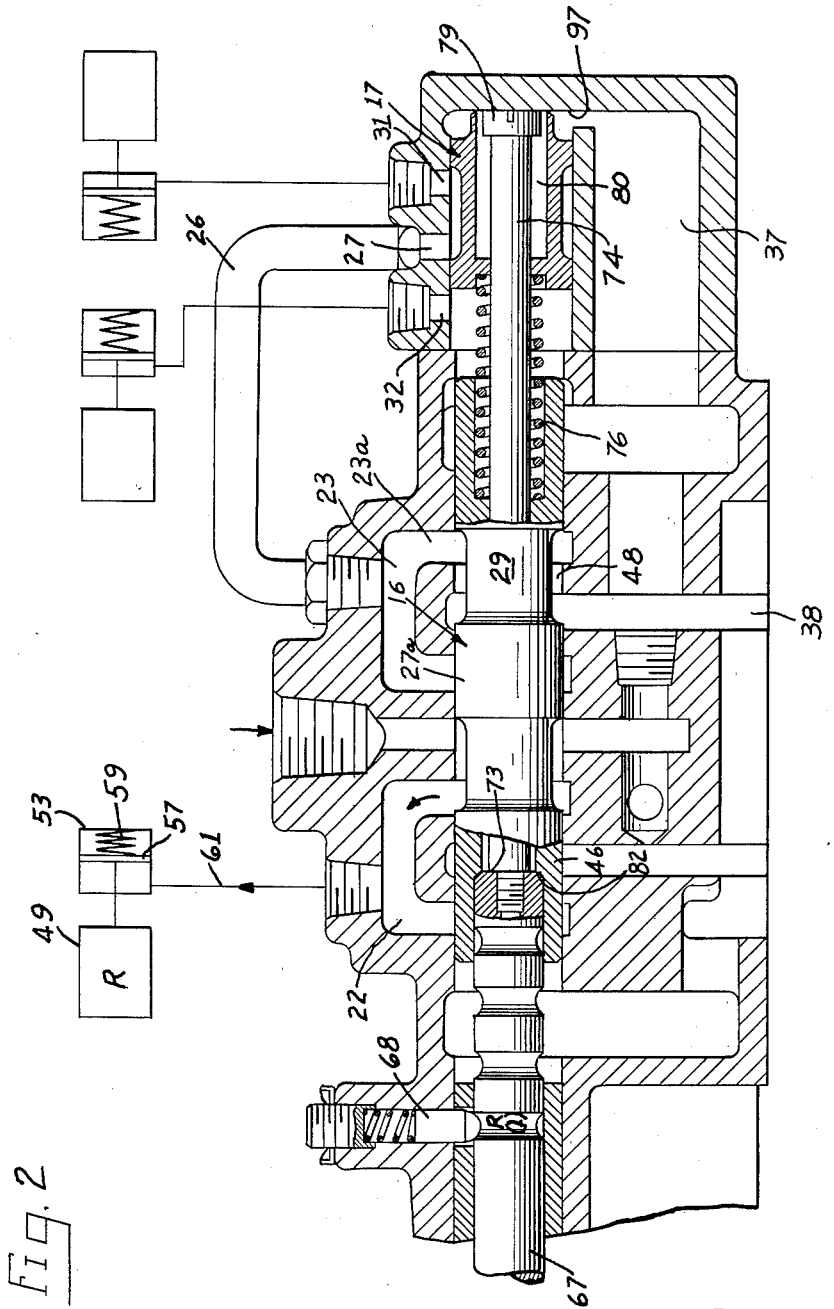

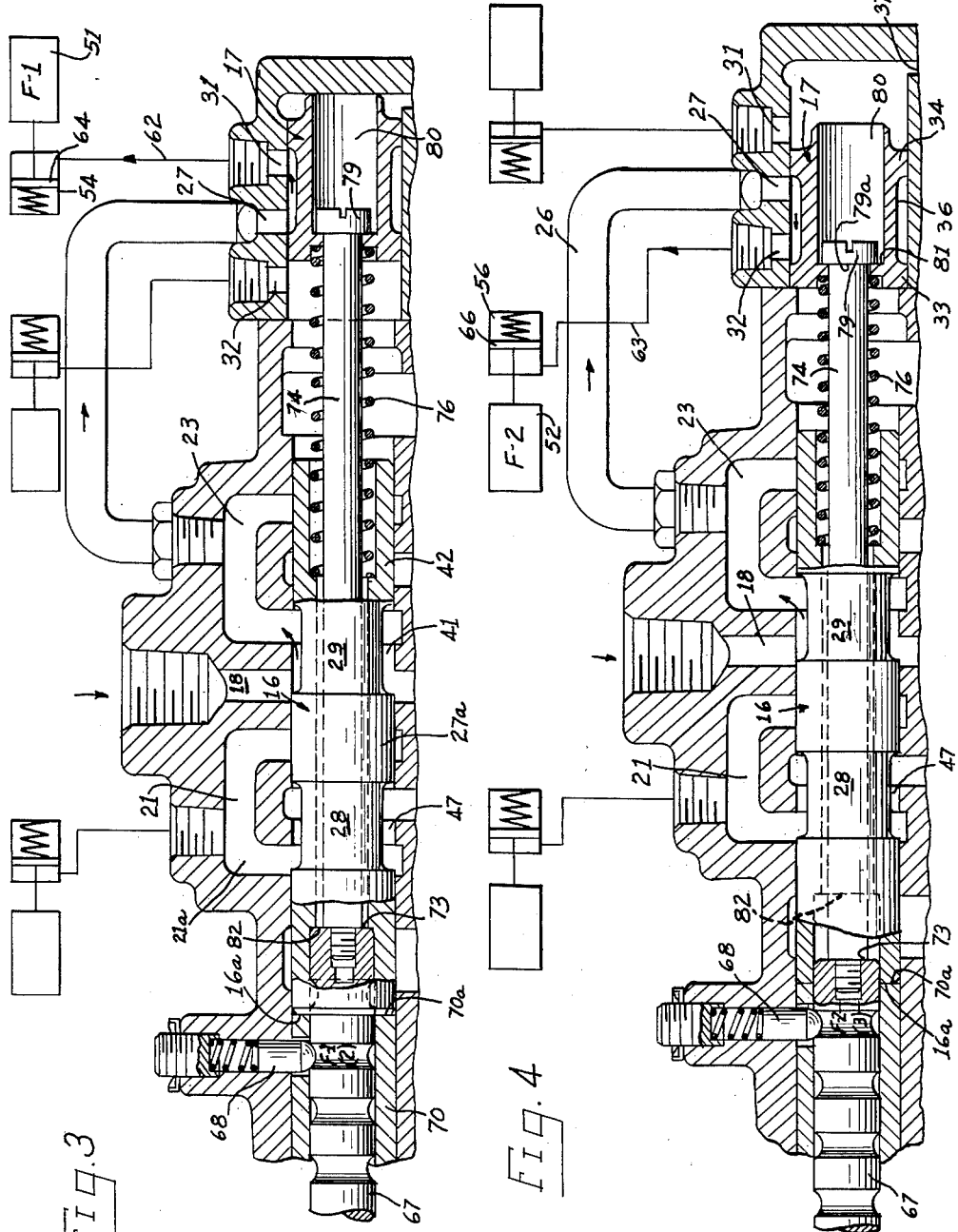

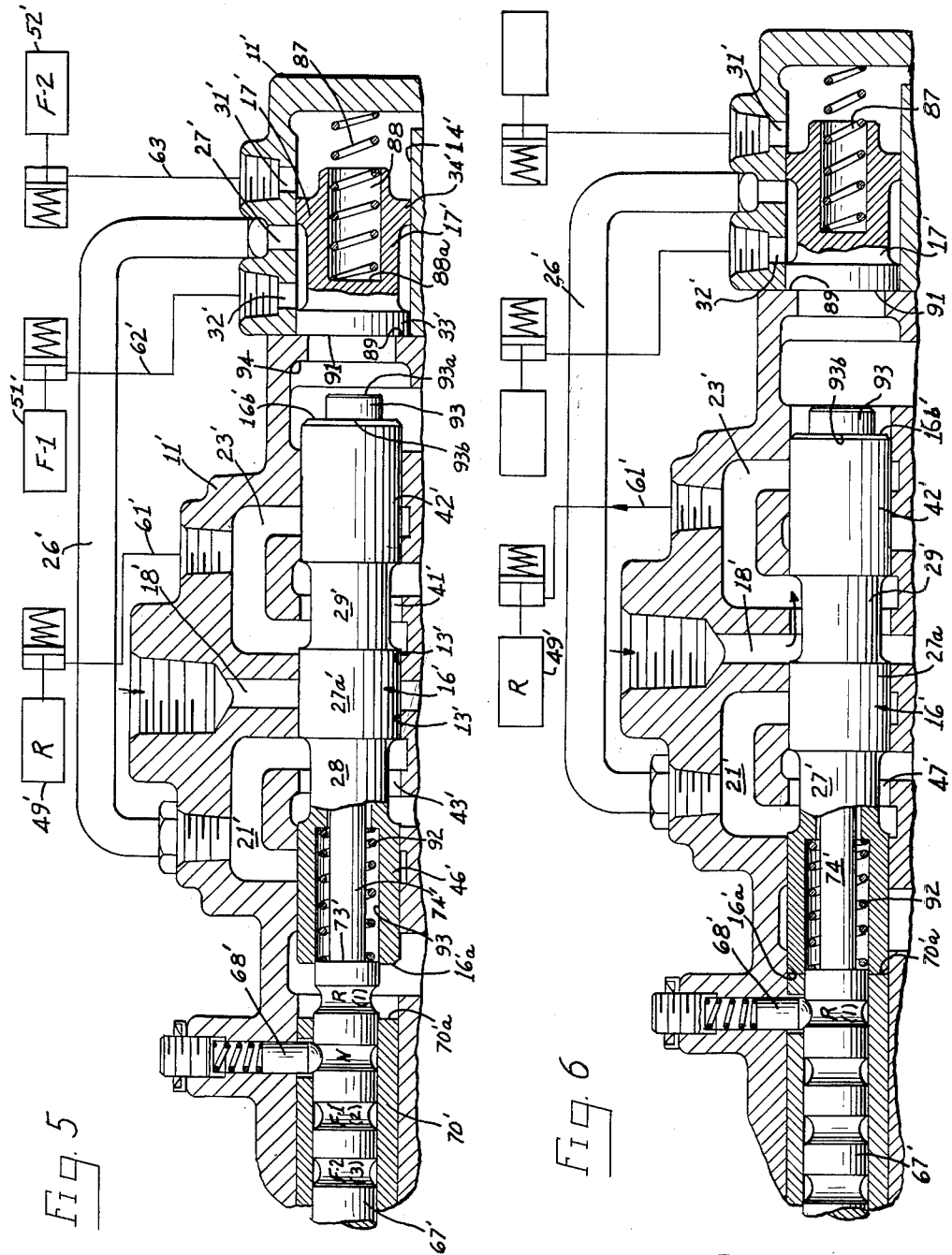

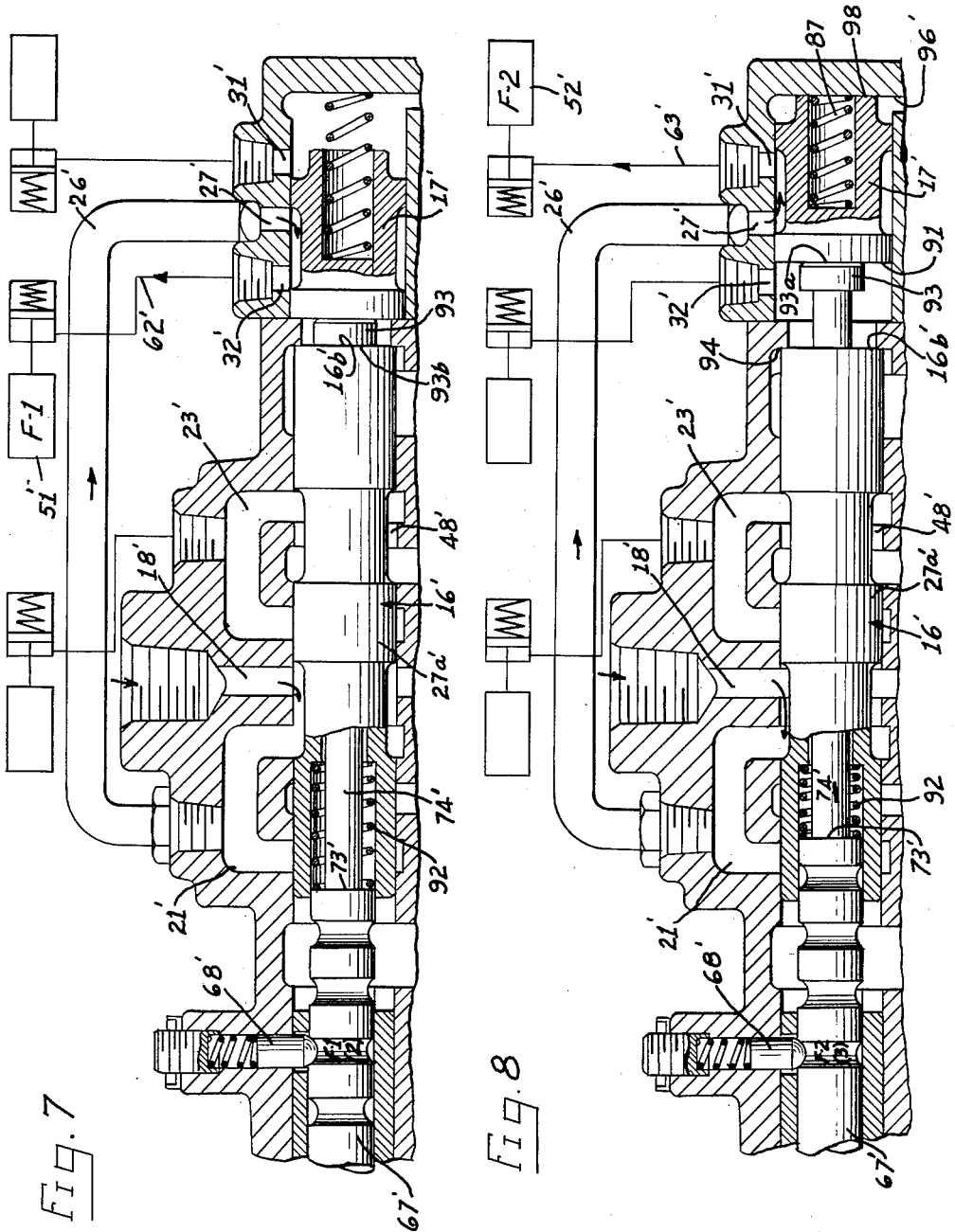

United States Patent Office 2,984,258
Patented May 16, 1961

2,984,258
CONTROL VALVE
Harry E. Clary, Chesterland, Ohio, assignor to Thompson Ramo Wooldridge Inc., Cleveland, Ohio, a corporation of Ohio
Filed July 20, 1959, Ser. No. 828,298
14 Claims. (Cl. 137—622)

The present invention relates to improvements in control valves.

In particular the present invention contemplates the provision of a control valve suitable for directing fluid such as oil for selectively operating hydraulic clutches to actuate automatic transmissions for vehicles. Certain types of automatic transmissions for vehicle and automotive applications are controlled by a number of clutches that are spring loaded toward the clutch release position. Hydraulic pressures are applied to overcome the spring force and engage the clutches. The operation of this type of transmission depends on a hydraulic control valve that will pressurize or vent any one of the several hydraulic clutch engaging units according to the position of the valve, which is operated by one or several control levers.

Valves conventionally used for this application are of the spool type with the valve body housing the spools and incorporating the necessary porting to accommodate one or more spools each of which normally controls two clutches. It is necessary to have one neutral position wherein both clutches are vented to the hydraulic oil system reservoir for each spool, as well as the position for each of the clutches being controlled by the spool. When one clutch is pressurized (engaged) all of the other clutches controlled by the spools are normally required to be vented (disengaged). A separate control lever is usually required to position each spool in the valve unless complex expensive linkage arrangements are employed to actuate two or more spools in the desired sequence with one control lever. A complex transmission used on heavy duty equipment often requires so many control levers that the operation of the vehicle is difficult.

The present invention contemplates in a preferred form the provision of a compound valve spool in a single housing means. A main valve spool either blocks the pressurized inlet supply of hydraulic fluid, or directs it to a first outlet passage for engaging the reverse clutch or to a second outlet passage for engaging any one of the forward clutches. An auxiliary valve spool controls the flow from the second outlet passage to direct it to a first or second auxiliary outlet passage to engage a first or a second forward clutch. The valve spools are operated by a single operating means driven by a single actuating rod. The operating means or actuating rod moves axially and in a first range of movement wherein the main valve spool is positioned in neutral or first or second position, and in a second range of movement wherein the main valve spool is stopped in second position and the auxiliary valve spool is moved between first and second positions. The single actuating rod can thus be moved in one direction from neutral to a first position wherein the vehicle is driven in reverse, or can be moved in the opposite direction from neutral to a second position wherein the vehicle can be driven forward in a first or a second forward speed. While the features of the valve are particularly well adapted to hydraulically controlling the clutches of automatic vehicle transmissions the improved features of the simplified compound valve are also well suited to various other utilizations as will become clear.

Accordingly, it is an object of the present invention to provide an improved compound valve which can be operated by single actuator to control the flow of pressurized fluid by blocking the fluid in a neutral position or by selectively directing the fluid to a different location in a plurality of positions of the actuator.

A further object of the invention is to provide an improved compound valve operated by a single actuator for controlling the flow of pressurized fluid, with the valve and actuator having a neutral position, and being operative to direct fluid to one outlet with movement in one linear direction and being operative to direct fluid to a plurality of other outlets with movement in the opposite direction.

A particular object of the invention is to provide an improved compound valve for operating hydraulically actuated fluid clutches wherein the valve is actuated by a single operator to operate a reverse clutch with movement in one direction from neutral and to operate selectively a plurality of forward clutches with movement in the opposite direction from neutral.

A still further object of the invention is to provide an improved compound valve well adapted to be utilized in a preferred form as a spool valve and wherein a plurality of spools are operated by single actuator and wherein the overall valve mechanism is of simplified form for reliability of operation and reduction of the expense of manufacture and assembly.

A still further object of the invention is to provide a compound (two sectioned) spool valve operated by one push rod and having a porting arrangement that completely balances the pressure on the sections of the spool.

Other objects and advantages will become more apparent with the teaching of the principles of the invention in connection with the disclosure of the preferred embodiments thereof in the specification, claims and drawings, in which:

Figure 2 is a view similar to Figure 1 and the showing of the valve shifted to a first position (Figure 1 shows the valve in a neutral position);

Figure 3 is a partial sectional view similar to Figure 1 showing the valve shifted to a second position;

Figure 4 is a partial sectional view similar to Figure 3 showing the valve shifted to a third position;

Figure 5 is a partial vertical sectional view of a valve constructed in accordance with the principles of the present invention but having a modified form, with the valve in neutral position;

Figure 6 is a partial sectional view similar to Figure 5 but showing the valve shifted out of neutral to a first position;

Figure 7 is a partial sectional view of the valve of Figures 5 and 6 and showing the valve shifted to a second position; and, Figure 8 is a partial sectional view similar to Figures 5 through 7 and showing the valve shifted to a third position.

As shown in the drawings:

Figure 1:
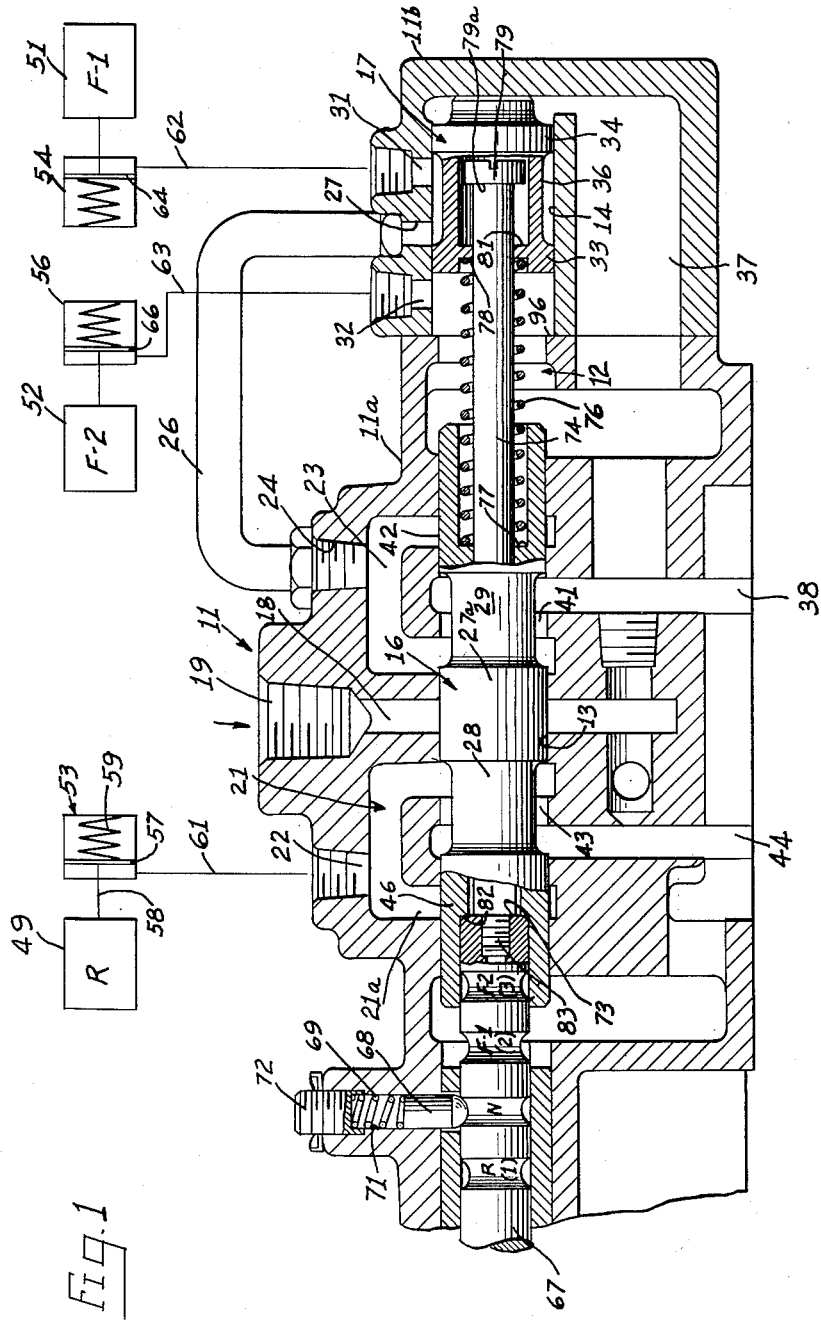
Figure 1 is a sectional view taken through the axis of a compound control valve constructed in accordance with the principles of the present invention and schematically illustrating clutches controlled by the valve.

As described primarily in connection with Figure 1, and as also shown in Figures 2, 3 and 4, the mechanism includes a valve body or housing 11 with a compound spool assembly 12 therein. The valve body 11 has an axially extending cylindrical opening providing a first main valve chamber 13 and a second auxiliary valve chamber 14. Slidable in the main valve chamber is a main valve spool member 16 and slidably positioned in the auxiliary valve chamber 14 is an auxiliary valve spool member 17. The pressurized fluid from a suitable source, such as a hydraulic pump or pressure storage tank, is directed into the valve body through a main inlet passage 18 which is threaded at 19 for the connection of a conduit. The main valve spool 16 directs flow from the inlet passage 18 either to a first main outlet passage 21, which is threaded at 22 for the connection of a conduit, or to a second main outlet passage 23, which is threaded at 24 for the connection of a conduit 26 that communicates between the second main outlet passage 23 and the auxiliary valve chamber 14 through an auxiliary chamber inlet passage 27. The main valve spool 16 has a control land 27a with reduced portions 28 and 29 on either side thereof for directing the flow from the inlet passage 18 to either of the first or second outlet passages 21 and 23 respectively.

Leading out from the auxiliary valve chamber 14 is a first auxiliary outlet passage 31, which is threaded for the connection of the conduit, and a second auxiliary outlet passage 32 which is also threaded. The auxiliary valve spool 17 has control lands 33 and 34 at its ends with a reduced portion 36 intermediate the lands for directing a flow from the auxiliary inlet passage 27 either to the first auxiliary outlet passage 31, or to the second auxiliary outlet passage 32.

The auxiliary valve chamber 14 communicates with an auxiliary vent chamber 37 that leads to a vent passage 38 from the housing so that when one of the auxiliary outlet ports 31 and 32 is pressurized the other is vented.

The main second outlet passage 23 is vented to a vent passage 38 when the main valve 16 is in the neutral position through an annular passage 41 formed by the reduced portion 29 of the main valve spool. The passage 41 is blocked by a vent blocking land 42 on the main valve spool, when the main valve 16 shifts to the left to the position of Figure 3, as will be later described in connection with that figure. In the neutral position of Figure 1, the first main outlet passage 21 is vented through an annular passage 43 formed by the reduced portion 28 of the main valve spool, to a vent passage 44. The annular vent passage 43 will be blocked by a blocking land 46 on the spool when the spool moves to the right to the position of Figure 2, as will be described later in connection with that figure. When the main valve spool 16 shifts to the left to pressurize the second outlet passage 23, the first outlet passage 21 is vented through the portion 21a via an annular passage 47 formed by the reduced portion 28 of the main valve spool, as illustrated in Figures 3 and 4. When the first outlet passage 21 is pressurized, the second outlet passage 23 is vented through a portion 23a via an annular passage 48 formed by the reduced porton 29 of the valve spool, as illustrated in Figure 2.

The control valve is shown connected to clutches and hydraulically actuated clutch engaging mechanism, which is shown schematically. As illustrated in Figure 1, a reverse clutch 49 (R), a first forward clutch 51 (F-1) and a second forward clutch 52 (F-2) are actuated respectively by hydraulically operated motors 53, 54 and 56. The motors are of identical construction, and as illustrated by the motor 53 include a piston 57 connected to a piston rod 58 which is in turn connected to the clutch. The piston is actuated by a spring 59 to a clutch disengaging position, and the admittance of hydraulic fluid under pressure to a line 61 moves the piston 57 to the right against the action of the spring and engages the clutch 49. Similarly the admittance of pressurized fluid to line 62 or 63 moves the pistons 64 or 66 to actuate either clutch 51 or 52. For purposes of illustration, the clutch 49 will be referred to as the reversing clutch, and the clutches 51 and 52 will be referred to as the clutches for driving the vehicle forwardly at a first and second speed. These clutches are identified to correspond with positions of a spool operator or an actuator rod 67.

The actuator rod 67 has notches which are marked N, R, F-1, and F-2 and the clutches are similarly marked R, F-1 and F-2. The actuator rod 67 shifts axially to the position as indicated to actuate the valve and is held in the selected position by a detent 68 which yieldingly engages the notches marked N, R, F-1 and F-2. The detent is backed by coil compression spring 69 mounted in a radial opening 71 in the valve body and held in place by a stud 72.

The compound valve, including the main spool 16 and the auxiliary spool 17, is operated by a first part of the actuator rod which comprises a shoulder 73 on the actuator rod, and a second part which comprises a drag link 74 extending through the valve spools, and spring biasing means 76. The spring means is illustrated in the preferred form as including a single spring which acts against a shoulder 77 at the base of a recess in the main valve spool 16 and a shoulder 78 at the base of a recess in the auxiliary valve spool. The spring 76 urges the main valve spool 16 to the left or to its second position and urges the auxiliary valve spool 17 to the right or to its first position. The drag link 74 has a head 79 which moves within the hollow interior of the auxiliary valve spool 17 and which has a surface 79a that engages a surface 81 of the auxiliary spool to move it to second position against the action of the spring 76. The main spool 16 has a shoulder 82 which is engaged by the shoulder 73 of the actuating rod to move the main spool against the spring 76 to the first position of the main valve spool. The drag link 74 is connected to the actuating rod 67 by having a threaded projection 83 which is threaded axially into the end of the actuating rod.

Since the actuating rod and the compound valve control the clutches; by way of example, the positions of the actuating rod relative to the valve spools will be described in a neutral position (marked N), a first position (marked R and (1)), a second position (marked (2) and F-1), or a third position (marked (3) and F-2). In response to the movements of the actuating rod, the first main valve spool 16 moves to a neutral, a first or second position, and the auxiliary valve spool 17 moves to a first or a second position. These corresponding positions will be described in connection with Figures 1 through 4.

Figure 1—Neutral position:
  Actuating rod 67—Neutral position (N).
  Main valve spool 16—Neutral position.
  All clutches released.

As illustrated in Figure 1, the flow through the main inlet passage 18 is blocked by the land 27a on the main valve spool 16. The first outlet passage 21 is vented through the annular passage 43 and the vent passage 44 and the second outlet passage 23 is vented through the annular passage 41 to the vent passage 38. The auxiliary chamber 14 receives no fluid under pressure. The first auxiliary outlet passage 31 is vented via the conduit 26 and the second auxiliary outlet passage 32 is vented via the valve chamber 37.

Figure 2—First position:
  Actuating member 67—Position (1).
  Main valve spool 16—First position.
  Clutch R engaged.

In this position of the main valve spool 16, the land 27a has been shifted to the right to pressurize the first outlet passage 21, and the second outlet passage 23 continues to be vented and is vented through the annular passage 48 to the vent passage 38. The first outlet passage 21 is no longer vented and the land 46 blocks the annular passage which was open in Figure 1. The auxiliary spool 17 remains in the same position with the auxiliary outlet passages 31 and 32 continuing to be vented.

In moving from the neutral position of Figure 1 to the first position of Figure 2, the shoulder 73 of the actuating rod engaged the shoulder 82 of the valve spool to move it to the right against the action of the spring 76, with the drag link head 79 moving freely within the hollow space 80 within the auxiliary spool 17.

Figure 3—Second position:
   Actuating rod 67—Position (2).
   Main valve spool 16—Second position.
   Auxiliary valve spool 17—First position.
   Clutch F-1 engaged.

The land 27a of the main valve spool 16 has moved to the left of the inlet passage 18 and pressurized fluid flows into the second main outlet passage 23. The passage is no longer vented and the land 42 blocks both of the annular passages which were open in Figure 1 and in Figure 2. The first main fluid delivery passage 21 is vented through the annular passage 47. The auxiliary valve spool remains at the first position and fluid flows from the auxiliary inlet passage 27 to the first auxiliary outlet passage 31, with the second auxiliary outlet passage 32 continuing to be vented.

In shifting to this position, the shoulder 73 of the actuating rod moves to the left to permit the spring 76 to shift the main valve spool 16 to the left until the end 16a of the valve spool engages a stop surface 70a of a bushing 70 which supports the actuating rod 67. The head 79 of the drag link moves freely to the left within the space 80 within the auxiliary valve spool 17.

Figure 4—Third position:
   Actuating rod 67—Position (3).
   Main valve spool 16—Second position.
   Auxiliary valve spool 17—Second position.
   Clutch F-2 engaged.

In this position of the compound valve, the second main outlet passage 23 continues to be pressurized with the first outlet passage 21 continuing to be vented. The second auxiliary outlet passage 32 is now pressurized with the fluid flowing between the lands 33 and 34 of the auxiliary valve in the space created by the reduced portion 36. The first auxiliary outlet passage 31 is vented through the chamber 37 of the valve body.

In moving the valve spools to this position, the actuating rod 67 moved its shoulder 73 away from the shoulder 82 inside of the main spool 16, while the end 16a of the main spool was held by the stop 70a, thus preventing the spool from being shifted further by action of the spring 76. The head 79 of the drag link pulls the auxiliary valve 17 to the left by its inner surface 79a engaging the surface 81 within the space 80 within the valve spool 17, moving it against the spring 76.

The arrangement of positions, with positions (2) and (3) to the right of position N, is especially advantageous in automatic transmission applications since the vehicle driver will find it convenient to selectively shift to reverse or to first and second forward positions in sequence.

In broader applications of the valve, it will be observed that the actuator travels through a first range of positions including the positions N, (1) and (2), in which range only the main spool 16 is actuated to its neutral or first and second positions. When the main valve spool is in the second position (where the second main outlet passage 23 is pressurized), the actuating rod travels through a second range of positions including positions (2) and (3), and in which range the main valve spool 16 is not moved but the auxiliary valve spool 17 is shifted. This extends the range of operation and function of the main valve spool permitting subdistribution of the fluid in the second outlet passage 23 with the same actuating rod 67.

A feature of the invention resides in the fact that with substantially the same parts, the valve can be adapted to a reversal of the relative locations of the reverse position (R) and the forward positions (F-1, F-2) with respect to neutral (N). In the arrangement of Figure 1, the forward positions are to the right of neutral on the actuating rod, while in the modified form of Figures 5-8, the forward positions are to the left of neutral while reverse is to the right thereof.

*Figures 5 through 8*

In the descriptions of Figures 5-8 similar parts will receive similar numerals, with a prime (′) suffix. The connection of the line 26 leading between the main valve chamber 13′ and the auxiliary valve chamber 14′ has been connected to outlet passage 21′. Passage 23′ will now be designated as the first main outlet passage and passage 21′ as the second main outlet passage. Passage 32′ will be named the first auxiliary outlet passage and passage 31′ the second auxiliary outlet passage.

The main valve spool 16′ is urged to the right (to the second position) by a spring 92. The auxiliary spool valve 17′ is urged to the left (to the first position) by a coil compression spring 87 which is positioned in the chamber 88 within the spool valve 17′ and engages the end 88a of the chamber. The spool is stopped in this position by an annular stop face 89 formed in the body and engaged by the end 91 of the auxiliary spool 17′.

The auxiliary spool 17′ is moved to the right, or to the second position, by the surface 93a of the head 93 of the drag link 74′ engaging the end surface 91 of the auxiliary spool. The other surface 93b of the drag link head 93 will engage the end 16b′ of the main spool 16′, as will be described, to move the main spool to the left. Pressurized fluid is delivered from the second main passage 21′ to the inlet passage 27′ of the auxiliary valve chamber 14′ through a conduit 26′ which is connected to the outlet passage 21′ on the left of the main valve chamber 13′ instead of on the right, as it is in Figure 1.

The main valve 16 is formed with a hollow chamber 93 in the left end to receive the coil compression spring 92 which bears against the end of the chamber 93 and against a shoulder 73′ on the actuating rod 67′. The spring 92 urges the main spool to the right or to the second position.

The compound valve is shown connected to hydraulically operated clutches 49′, 51′ and 52′, although the connecting lines between the valve body and clutches are changed as compared with Figures 1-4. The line 61′ to the clutch 49′ is connected to the first main outlet passage 23′ (to the right of the inlet passage instead of to the left as in Figures 1 through 5) and the line 63′ is connected to the auxiliary outlet passage 31′ on the right and the line 62′ is connected to the auxiliary outlet passage 32′ on the left, these positions are being reversed from the arrangement of Figure 1.

Figure 5—Neutral position:
   Actuating rod 67′—Position (N).
   Main valve spool 16′—Neutral position.
   All clutches disengaged.

The land 27a′ blocks the main inlet passage 18′, and the outlet passage 23′ (which is now designated as the first outlet passage) is vented through the annular passage 41′ and the main outlet passage 21′ (which is now designated as the second outlet passage) is vented through the annular passage 43′. The first and second auxiliary outlet passages 32′ and 31′ are also vented.

Figure 6—First position:
   Actuating rod—Position (1).
   Main spool 16′—First position.
   Clutch R engaged.

In this position, the first main outlet passage 23′ is pressurized to actuate the reverse fluid clutch 49′. The second main outlet passage 21′ is vented and the first and second auxiliary outlet passages 32′ and 31′ are vented.

To move to this position, the actuating rod 67′ has been drawn to the left so that the detent 68′ drops in the notch R and the surface 93b of the head 93 of the drag link 74' engages the end 16b' of the main valve spool 16' and draws it to the left against the spring 92.

Figure 7—Second position:
  Actuating rod 67'—Position (2).
  Main spool 27—Second position.
  Auxiliary spool 17'—First position.
  Clutch F-1 engaged.

The first main outlet passageway 23' is vented through the annular passage 48', the second main outlet passageway 21' is pressurized, and the first auxiliary outlet passageway 32' is pressurized to actuate the clutch 51' (F-1). The second auxiliary outlet passage 31' is vented.

To move to this position, the actuating rod 67' has been moved to the right until the detent 68' snaps into the notch F-1, and the head 93 of the drag link 74' moves to the right with the actuating rod and the main spool 16' is carried therewith since it is urged against the head 93 of the drag link by the spring 92.

Figure 8—Third position:
  Actuating rod 67—Position (3).
  Main spool 16'—Second position.
  Auxiliary spool 17'—Second position.
  Clutch F-2 engaged.

In this position of the compound valve the first main outlet passage 23' is vented through the annular passage 48', and the second main outlet passage 21' is pressurized. The first auxiliary outlet passage 32' is vented and the second auxiliary outlet passage 31' is pressurized.

To move the valve spools to this position, the actuating rod 67 is moved to the right so that the detent 68' drops in the notch F-2. The main spool 16' engages a stop shoulder 94 in the valve body with its end 16b' to hold the main valve in the second position, and the coil spring 92 compresses as the actuating rod moves to the right. The head 93 of the drag link engages the end 91 of the auxiliary valve spool 17' to push it to the right to its second position compressing its spring 87.

Thus, with the embodiment of Figures 5 through 8, the actuating rod 67' moves through a first range of positions ((N), (1) and (2)) to selectively block or distribute the incoming pressurized fluid; and moves through a second range of positions (positions (2) and (3)) without moving the main valve and operating the auxiliary valve to sub-distribute the fluid from one of the main outlet passages.

Thus it will be seen that the arrangement is readily adaptable to meet requirements such as those presented in operating hydraulically actuated automatic clutches and wherein the parts with slight modification can be changed so that the first and second forward positions are at either side of the neutral position and opposite the reverse position. The mechanism provides a simplified compound valve which meets the objects and advantages hereinbefore set forth and is reliable in operation.

It will be noted that the valve spools are pressure balanced in all positions. In each position the ends are exposed to vent pressure and the shoulders at each end of the reduced portions 28 and 29 of the main valve and at each end of the reduced portion 36 of the auxiliary valve are always both exposed either to vent pressure or inlet pressure so that the valve is balanced at all positions.

As illustrated in Figure 1, the diameter of the auxiliary valve chamber 14 may be constructed slightly larger than the diameter of the main valve chamber 13 so as to provide a stop shoulder 96 at the end of the chamber. This will prevent the actuating rod 67 from being moved accidentally too far to the left inasmuch as the head 79 of the drag link will engage the end surface 81 within the auxiliary valve spool and the spool will be stopped. As illustrated in Figure 2, the length of the drag link 74 is constructed so that it will engage the end wall 97 of the housing and prevent the actuating rod 69 from being forced too far to the right.

In the embodiments of Figures 5 through 8, the actuating rod 67 is prevented from being drawn too far to the left by the end 16a' of the spool engaging the stop surface 70a'. As illustrated in Figure 8, the actuating rod 67' is prevented from being forced too far to the right since the head 93 of the drag linkage engages the auxiliary spool and it is stopped by its end 98 engaging the end wall 96' of the valve body.

The conduit 26 is in the form of tubing connected externally of the valve body and it will be understood that this can be cast integral with the valve body 11 or 11'.

The housing is shown as divided into portions 11a and 11b (Figure 1) so that the portion 11b which contains the auxiliary spool can be a separate piece, and alignment between the main valve chamber 13 and the auxiliary valve chamber 14 is not critical. This facilitates machining operations by avoiding the long boring operation which would be necessary in the main housing to accommodate the entire spool assembly. Other variations in construction may be effected within the teachings of the invention as will be appreciated by those skilled in the art.

The drawings and specification present a detailed disclosure of the preferred embodiments of the invention, and it is to be understood that the invention is not limited to the specific forms disclosed, but covers all modifications, changes and alternative constructions and methods falling witthin the scope of the principles taught by the invention.

I claim as my invention:

1. A control valve comprising in combination a valve body means with axially extending interconnected chambers therein providing a main chamber and an auxiliary chamber; a main valve spool member mounted in the main chamber, and movable between a neutral position, a first position, and a second position; an auxiliary valve spool member mounted in the auxiliary chamber and movable between a first position and a second position; a main inlet passage communicating with said main chamber, a first main outlet passage and a second main outlet passage in said valve body communicating with said main chamber; a first auxiliary outlet passage and a second auxiliary outlet passage communicating with said auxiliary chamber; means interconnecting said second main outlet passage and said auxiliary chamber, said main valve member controlling flow between said main inlet passage and said main outlet passages with said main inlet passage being out of communication with said main outlet passages in said neutral position, being in communication with said first main outlet passage in said first position, and being in communication with said second main outlet passage in said second position, and being in communication with said second main outlet passage in said second position; said auxiliary valve member controlling flow from said auxiliary chamber to said auxiliary outlet passages; an actuating rod having a drag link thereon extending through said main and auxiliary valve spool members, said actuating rod having a main valve first range of movement and an auxiliary valve second range of movement; biasing means and means connected to said rod for moving the main valve member in said first range; a stop holding said main valve member against movement in said second range of movement of said rod; and auxiliary biasing means for said auxiliary valve member, said auxiliary biasing means and said drag link moving the auxiliary valve member in said second range of movement of said rod.

2. A control valve comprising in combination a valve body; a main inlet passage in said valve body; a main valve member movable relative to said body between a neutral position, a first position, and a second position; a first main valve outlet passage in said valve body; a second main valve outlet passage in said valve body; a first auxiliary outlet passage in said valve body, and a second auxiliary outlet passage in said valve body; an auxiliary valve member movable relative to said valve body between a first position and a second position; said main valve member controlling flow between said main inlet passage and said main outlet passages with said main inlet passage being out of communication with said main outlet passages in said neutral position, being in communication with said first main outlet passage in said first position, and being in communication with said second main outlet passage in said second position; said auxiliary valve member controlling flow between said second main outlet passage and auxiliary outlet passages, said second main outlet passage being in communication with said first auxiliary outlet passage in the first position of said auxiliary valve member, and being in communication with said second auxiliary outlet passage in the second position of said auxiliary valve member; and a valve operating means connected to said main valve member and said auxiliary valve member and being movable between a neutral position, a first position, a second position, and a third position; said operating means moving the main valve member to the neutral position when moved to neutral position, moving the main valve member to first position when moved to first position, moving the main valve member to second position and the auxiliary valve member to first position when moved to second position, and holding the main valve member in second position and moving the auxiliary valve member to second position when moved to third position.

3. A control valve comprising in combination a valve body; a main inlet passage in said valve body; a main valve member movable relative to said body between a neutral position, a first position, and a second position; a first main valve outlet passage in said valve body; a second main valve outlet passage in said valve body; a first auxiliary outlet passage in said valve body, and a second auxiliary outlet passage in said valve body; an auxiliary valve member movable relative to said valve body between a first position and a second position; said main valve member controlling flow between said main inlet passage and said main outlet passages with said main inlet passage being out of communication with said main outlet passages in said neutral position, being in communication with said first main outlet passage in said first position, and being in communication with said second main outlet passage in said second position; said auxiliary valve member controlling flow between said second main outlet passage and said auxiliary outlet passage, said second main outlet passage being in communication with said first auxiliary outlet passage in the first position of said auxiliary valve member, and being in communication with said second auxiliary outlet passage in the second position of said auxiliary valve member; and a valve operating means connected to said main valve member and said auxiliary valve member and being movable between a neutral position, a first position, a second position, and a third position; said operating means moving the main valve member to the neutral position when moved to neutral position, moving the main valve member to first position when moved to first position, moving the main valve member to second position and the auxiliary valve member to first position when moved to second position, and holding the main valve member in second position and moving the auxiliary valve member to second position when moved to third position, said first position of the operating means being at one side of the neutral position and the said second and third positions being at the other side of the neutral position.

4. A control valve comprising in combination a valve body; a main inlet passage in said valve body; a main valve member movable relative to said body between a neutral position, a first position, and a second position; a first main valve outlet passage in said valve body, and a second main valve outlet passage in said valve body; a first auxiliary outlet passage in said valve body, and a second auxiliary outlet passage in said valve body; an auxiliary valve member movable relative to said valve body between a first position and a second position; said main valve member controlling flow between said main inlet passage and said main outlet passages with said main inlet passage being out of communication with said main outlet passages in said neutral position, being in communication with said first main outlet passage in said first position, and being in communication with said second main outlet passage in said second position; said auxiliary valve member controlling flow between said second main outlet passage and said auxiliary passages, said second main outlet passage being in communication with said first auxiliary outlet passage in the first position of said auxiliary valve member, and being in communication with said second auxiliary outlet passage in the second position of said auxiliary valve member; biasing means urging said auxiliary valve member to first position; a stop for said auxiliary valve stopping its movement when traveling from second to first position; and a valve operating means connected to said main valve member and said auxiliary valve member and being movable between a neutral position, a first position, a second position, and a third position; said operating means moving the main valve member to the neutral position when moved to neutral position, moving the main valve member to first position when moved to first position, moving the main valve member to second position and releasing the auxiliary valve member to said biasing means to be in first position when moved to second position, and holding the main valve member in second position and moving the auxiliary valve member against the biasing means to move it to second position when moved to third position.

5. A control valve comprising in combination a valve body; a main inlet passage in said valve body; a main valve member movable relative to said body between a neutral position, a first position, and a second position; a first main valve outlet passage in said valve body, and a second main valve outlet passage in said valve body; a first auxiliary outlet passage in said valve body, and a second auxiliary outlet passage in said valve body; an auxiliary valve member movable relative to said valve body between a first position and a second position; said main valve member controlling flow between said main inlet passage and said main outlet passages with said main inlet passage being out of communication with said main outlet passages in said neutral position, being in communication with said first main outlet passage in said first position, and being in communication with said second main outlet passage in said second position; said auxiliary valve member controlling flow between said second main outlet passage and said auxiliary outlet passages, said second main outlet passage being in communication with said first auxiliary outlet passage in the first position of said auxiliary valve member, and being in communication with said second auxiliary outlet passage in the second position of said auxiliary valve member; biasing means urging said main valve member to second position; a stop for said main valve member stopping its movement in said second position when traveling from neutral to second position; and a valve operating means connected to said main valve member and said auxiliary valve member and being movable between a neutral position, a first position, a second position, and a third position; said operating means moving the main valve member to neutral position when moved to the neutral position, moving the main valve member to first position when moved to first position, moving the main valve member to second position and moving the auxiliary valve member to first position when in second position, and moving the auxiliary valve member to second position when moved to third position.

6. A control valve comprising in combination a valve body; a main inlet passage in said valve body; a main valve member movable relative to said body between a neutral position, a first position, and a second position; a first main valve outlet passage in said valve body, and a second main valve outlet passage in said valve body; a first auxiliary outlet passage in said valve body, and a second auxiliary outlet passage in said valve body; an auxiliary valve member movable relative to said valve body between a first position and a second position; said main valve member controlling flow between said main inlet passage and said main outlet passages with said main inlet passage being out of communication with said main outlet passages in said neutral position, being in communication with said first main outlet passage in said first position, and being in communication with said second main outlet passage in said second position; said auxiliary valve member controlling flow between said second main outlet passage and said auxiliary outlet passages, said second main outlet passage being in communication with said first auxiliary outlet passage in the first position of said auxiliary valve member, and being in communication with said second auxiliary outlet passage in the second position of said auxiliary valve member; a spring positioned between said main and said auxiliary valve members and urging the main valve member toward its second position and the auxiliary valve member toward its first position; and a valve operating means connected to said main valve member and said auxiliary valve member and being movable between a neutral position, a first position, a second position, and a third position; said operating means moving the main valve member to the neutral position when moved to neutral position, moving the main valve member to first position against the biasing means when moved to first position, permitting said biasing means to move the main valve member to second position when moved to second position, and moving the auxiliary valve member against the biasing means to move it to second position when moved to third position.

7. A control valve comprising in combination a valve body; a main inlet passage in said valve body; a main valve member movable relative to said body between a neutral position, a first position, and a second position; a first main valve outlet passage in said valve body, and a second main valve outlet passage in said valve body; a first auxiliary outlet passage in said valve body, and a second auxiliary outlet passage in said valve body; an auxiliary valve member movable relative to said valve body between a first position and a second position; said main valve member controlling flow between said main inlet passage and said main outlet passages with said main inlet passage being out of communication with said main outlet passages in said neutral position, being in communication with said first main outlet passage in said first position, and being in communication with said second main outlet passage in said second position; said auxiliary valve member controlling flow between said second main outlet passage and said auxiliary outlet passage, said second main outlet passage being in communication with said first auxiliary outlet passage in the first position of said auxiliary valve member, and being in communication with said second auxiliary outlet passage in the second position of said auxiliary valve member; first biasing means urging the main valve to second position, a stop limiting the movement of the main valve stopping its movement in second position when traveling from first to second position, second biasing means urging said auxiliary valve to first position, a stop for the auxiliary valve stopping it in first position when moving from second to first position; and a valve operating means connected to said main valve member and said auxiliary valve member and being movable between a neutral position, a first position, a second position, and a third position; said operating means moving the main valve member to the neutral position when moved to neutral position, moving the main valve member to first position when moved to first position, moving the main valve to second position when moved to second position, and moving the auxiliary valve to second position when moved to third position.

8. A control valve comprising in combination a valve body; a main inlet passage in said valve body; a main valve member movable relative to said body between a neutral position, a first position, and a second position; a first main valve outlet passage in said valve body, and a second main valve outlet passage in said valve body; a first auxiliary outlet passage in said valve body, and a second auxiliary outlet passage in said valve body; an auxiliary valve member movable relative to said valve body between a first position and a second position; said main valve member controlling flow between said main inlet passage and said main outlet passages with said main inlet passage being out of communication with said main outlet passages in said neutral position, being in communication with said first main outlet passage in said first position, and being in communication with said second main outlet passage in said second position; said auxiliary valve member controlling flow between said second main outlet passage and said auxiliary outlet passages, said second main outlet passage being in communication with said first auxiliary outlet passage in the first position of said auxiliary valve member, and being in communication with said second auxiliary outlet passage in the second position of said auxiliary valve member; biasing means urging said auxiliary valve member to first position; a stop for said auxiliary valve stopping its movement when moving from second to first position; a valve operating means connected to said main valve member and said auxiliary valve member and being movable between a neutral position, a first position, a second position, and a third position; said operating means moving the main valve member to the neutral position when moved to neutral position, moving the main valve member to first position when moved to first position, moving the main valve to second position, said auxiliary valve member released and biased to first position when said operating means is moved to second position, and holding the main valve member in second position and moving the auxiliary valve against the biasing means to second position when moved to third position; and positive stops on said body for said valve members preventing over-travel of said operating means.

9. A control valve comprising in combination a valve body; a main inlet passage in said valve body; a main valve member movable relative to said body between a neutral position, a first position, and a second position; a first main valve outlet passage in said valve body, and a second main valve outlet passage in said valve body; a first auxiliary outlet passage in said valve body, and a second auxiliary outlet passage in said valve body; an auxiliary valve member movable relative to said valve body between a first position and a second position; said main valve member controlling flow between said main inlet passage and said main outlet passages with said main inlet passage being out of communication with said main outlet passages in said neutral position, being in communication with said first main outlet passage in said first position, and being in communication with said second main outlet passage in said second position; said auxiliary valve member controlling flow between said second main outlet passage and said auxiliary outlet passage, said second main outlet passage being in communication with said first auxiliary outlet passage in the first position of said auxiliary valve member, and being in communication with said second auxiliary outlet passage in the second position of said auxiliary valve member; a valve operator having a first part for engaging said main valve member and having a second part for engaging said auxiliary valve member, said parts movable together and being movable between a neutral position, a first position, a second position, and a third position; biasing means urging said main valve member to second position, a stop for said main valve member stopping its movement in said second position when traveling from neutral to second position; biasing means urging said auxiliary valve member to first position, a stop for said auxiliary valve stopping its movement when traveling from second to first position, said first operator part moving the main valve member to neutral position when in neutral position, moving the main valve member to first position when moved to first position, and moving the main valve member to second position when in second position; and said second operator part moving the auxiliary valve to second position when moved to third position.

10. A control valve comprising in combination a valve body means with main and auxiliary valve chambers therein, a main valve spool member movably mounted in said main chamber, an auxilary valve spool member movably mounted in the auxiliary chamber, means connecting the main chamber to the auxiliary chamber in one of the positions of the main spool member, an operating member connected for operating said main and auxiliary valve spool members and movable through a first range and a second range of movement, first and second biasing means for said valve spools, first means on said operating member for operating said main valve spool member with said first biasing means in said first range, and a second means on said operating member co-acting with said second biasing means for operating said auxiliary valve spool in said second operating range.

11. A control valve comprising in combination a valve body; a main valve member movable relative to said body, an auxiliary valve member movable relative to said valve body, passages in said body controllable by said valve members, a valve operating means, a resilient connection between said operating means and said main valve member, means connecting said operating means to said auxiliary valve member, and a stop positioned to be engaged by said main valve member whereby said operating means may be moved past the position where the main valve engages said stop to continue operating said auxiliary valve.

12. A control valve comprising in combination a valve housing body means with main and auxiliary cylindrical chambers therein, a main valve spool member mounted in the main chamber, an auxiliary valve spool member mounted in the auxiliary chamber, a valve operating means connected to said main valve member and said auxiliary valve member for shifting said valve members, a plurality of passages in said body communicating with said main chamber and controlled by the main valve spool member, a plurality of passages in said body communicating with said auxiliary chamber and controlled by said auxiliary valve spool member, and vent passages interconnecting the ends of said chambers to balance the axial pressures on each of said spool members in all positions of the operating means.

13. A control valve comprising in combination a valve body means having a main valve chamber therein and an auxiliary valve chamber therein, a main valve member movable within said main chamber, an auxiliary valve member movable within said auxiliary valve chamber, an inlet passage in said valve body communicating with said main chamber, a plurality of outlet passages in said main body communicating with said main chamber, said main valve member movable to a plurality of positions to selectively control communication between said inlet passage and said outlet passages, an auxiliary inlet passage communicating with one of said outlet passages and with said auxiliary chamber, a plurality of auxiliary outlet passages, said auxiliary valve member movable within the auxiliary valve chamber to selectively control communication between the auxiliary inlet passage and said auxiliary outlet passages, and an operating member connected to said main valve member and said auxiliary valve member and movable through a first range of movement and a second range of movement, said operating member moving said main valve member in said first range of movement, and in said second range of movement holding said first valve member in a position to cause communication between the inlet passage and said auxiliary inlet passage and selectively moving said auxiliary valve member through its positions.

14. A control valve comprising in combination a valve body, a main valve member movable relative to said body, an auxiliary valve member movable relative to said valve body, passages in said body controllable by said valve members, and a valve operating means connected to said main valve member and said auxiliary valve member and movable in a first and a second range of movement, said main valve member movable by said operating means in said first range of movement and said auxiliary valve member movable by said valve operating means in said second range of movement, said main valve member controlling a passage to direct flow to said auxiliary valve member in said second range of movement.

References Cited in the file of this patent

UNITED STATES PATENTS 2,802,453   Harp _____ Aug. 13, 1957